UNITED STATES PATENT OFFICE.

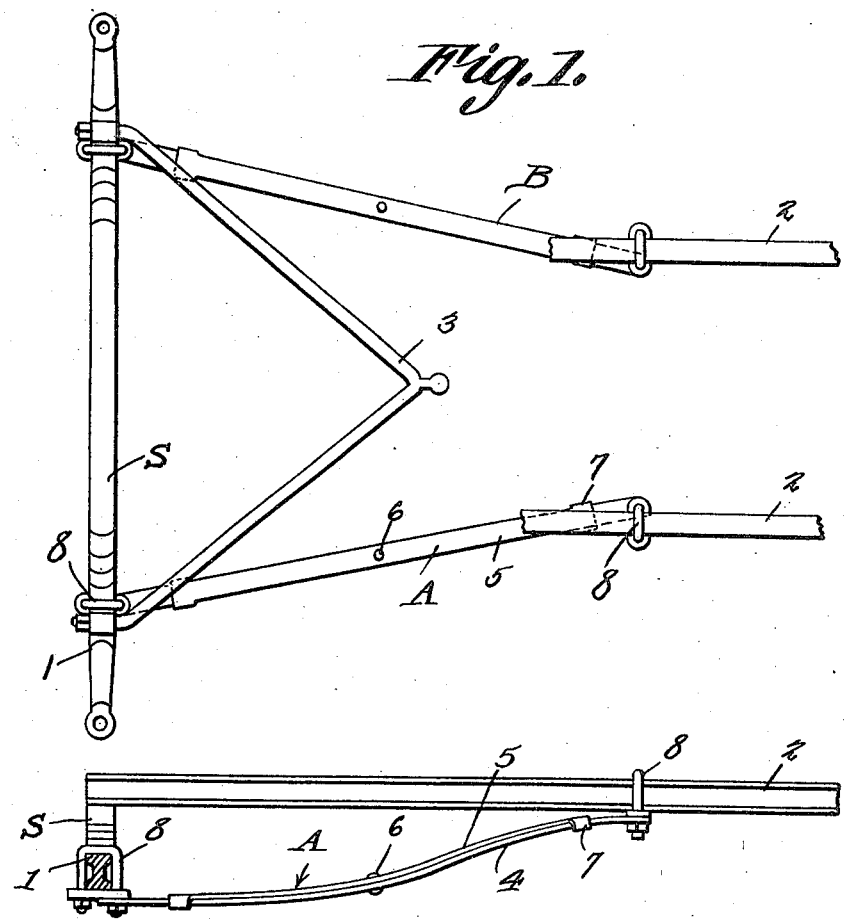

ROBERT W. MATTHIES, OF HAMMOND, INDIANA.

AUTOMOBILE-BRACE.

1,323,712.　　　　Specification of Letters Patent.　　　Patented Dec. 2, 1919.

Application filed March 8, 1918.　Serial No. 221,174.

*To all whom it may concern:*

Be it known that I, ROBERT W. MATTHIES, a citizen of the United States, residing at Hammond, in the county of Lake and State of Indiana, have invented a new and useful Automobile-Brace, of which the following is a specification.

This invention relates to braces to be used primarily on the well known Ford automobile for the purpose of reinforcing the front radius rod, one of its objects being to provide a spring brace which can be attached readily to the front axle and to the chassis, and thus serve not only as a reinforcement for the radius rod but also as a relief for the front spring of the vehicle.

With the foregoing and other objects in view which will appear as the description of the invention proceeds, the invention consists of certain novel details of construction and combinations of parts which will be hereinafter more fully described and pointed out in the claim, it being understood that various changes may be made in the arrangement and proportions of the parts without departing from the spirit or sacrificing any of the advantages of the invention.

In the accompanying drawings the preferred form of the invention has been shown.

In said drawings—

Figure 1 is a plan view of a portion of a vehicle having the present improvements applied thereto.

Fig. 2 is a side elevation thereof.

Referring to the figures by characters of reference, 1 designates the front axle of a Ford automobile and 2 designates portions of the chassis, the radius rod being indicated at 3. The present invention consists of two spring braces A and B which are duplicates and each of which includes a lower, long spring strip 4 and an upper shorter spring strip 5 placed in contact with each other. The two strips are secured together at their centers by a rivet 6 and the ends of the upper strip are formed with laterally extending wings 7 which are bent downwardly and inwardly under the strip 4. The front ends of the braces A and B are attached to the axle 1 by clips and their rear ends are connected by clips to the chassis at points back of the engine of the vehicle. The two sets of clips have been shown at 8.

As hereinbefore stated, spring braces such as described and secured at the points mentioned, will reinforce the radius rod and will also relieve the front springs of the vehicle of a portion of the strain to which it is ordinarily subjected.

It will be noted that the braces are curved from end to end and converge rearwardly, this being necessary to permit the necessary yielding action and to give the desired strength.

What is claimed is:—

The combination with the front axle of a vehicle, and a spring secured thereon, and a chassis mounted on the spring, of forwardly diverging laminated springs each connected at one end to one side of the chassis and at its other end to one end portion of the axle, said springs constituting supplemental braces for the axle and reinforcements for the springs, the ends of one layer of each spring being bent about the other layer of said spring, the said layers being connected together at an intermediate point.

In testimony that I claim the foregoing as my own, I have hereto affixed my signature in the presence of two witnesses.

ROBERT W. MATTHIES.

Witnesses:
　JOHN A. SHEPHERD,
　ARTHUR HOWARD.